(12) United States Patent
Woo et al.

(10) Patent No.: US 11,787,477 B2
(45) Date of Patent: Oct. 17, 2023

(54) CHASSIS FRAME FOR ELECTRIC VEHICLE

(71) Applicant: HYUNDAI MOBIS CO., LTD., Seoul (KR)

(72) Inventors: Hyun Jin Woo, Yongin-si (KR); Hyoun Young Oh, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/586,011

(22) Filed: Jan. 27, 2022

(65) Prior Publication Data

US 2022/0242487 A1 Aug. 4, 2022

(30) Foreign Application Priority Data

Feb. 3, 2021 (KR) .................. 10-2021-0015308

(51) Int. Cl.
*B60K 1/04* (2019.01)
*B60L 50/64* (2019.01)
*B62D 21/15* (2006.01)
*B62D 25/02* (2006.01)
*B62D 25/20* (2006.01)

(52) U.S. Cl.
CPC .............. *B62D 21/157* (2013.01); *B60K 1/04* (2013.01); *B62D 25/025* (2013.01); *B60K 2001/0438* (2013.01)

(58) Field of Classification Search
CPC .... B62D 21/05; B62D 21/155; B62D 21/157; B62D 25/025; B62D 25/2036; B60K 1/04; B60K 2001/0438; B60L 50/64; B60Y 2200/91; B60Y 2304/03
See application file for complete search history.

(56) References Cited

U.S. PATENT DOCUMENTS

2012/0161472 A1* 6/2012 Rawlinson .............. B60R 16/04
296/187.08
2018/0148106 A1* 5/2018 Ayukawa ............... B62D 25/20
2018/0312199 A1* 11/2018 Kawase .................... B60K 1/04
(Continued)

FOREIGN PATENT DOCUMENTS

CN 102905959 A * 1/2013 ............... B60K 1/04
CN 113443011 A * 9/2021 ............... B60K 1/04
(Continued)

OTHER PUBLICATIONS

Description Translation for DE 102013/006702 from Espacenet (Year: 2013).*
(Continued)

*Primary Examiner* — Jason D Shanske
*Assistant Examiner* — Daniel M. Keck
(74) *Attorney, Agent, or Firm* — NSIP Law

(57) ABSTRACT

A chassis frame for an electric vehicle is provided. The chassis frame includes: side sill parts spaced apart from each other in a widthwise direction of the electric vehicle, and configured to absorb a shock force applied to the electric vehicle; a frame part provided between the side sill parts, and configured to have a battery disposed therein; a cover part detachably coupled to the frame part, and configured to support the battery disposed in the frame part; and a movement prevention part provided between the frame part and the cover part, and configured to prevent a movement of the battery.

6 Claims, 6 Drawing Sheets

(56) References Cited

U.S. PATENT DOCUMENTS

| | | | |
|---|---|---|---|
| 2019/0256152 A1* | 8/2019 | Ranga | B60L 50/64 |
| 2021/0245810 A1* | 8/2021 | Walker | B62D 25/025 |
| 2022/0126665 A1* | 4/2022 | Lee | B62D 25/2036 |
| 2022/0194197 A1* | 6/2022 | Park | H01M 50/249 |
| 2022/0410973 A1* | 12/2022 | Kim | B62D 25/20 |

FOREIGN PATENT DOCUMENTS

| | | | |
|---|---|---|---|
| DE | 102013006702 A1 * | 10/2014 | B60K 1/04 |
| KR | 20220151799 A * | 11/2022 | |

OTHER PUBLICATIONS

Description Translation for CN 113443011 from Espacenet (Year: 2021).*

* cited by examiner

CHASSIS FRAME FOR ELECTRIC VEHICLE

CROSS-REFERENCE TO RELATED APPLICATION

This application claims the benefit under 35 USC § 119(a) of Korean Patent Application No. 10-2021-0015308, filed on Feb. 3, 2021 in the Korean Intellectual Property Office, the entire disclosure of which is incorporated herein by reference for all purposes.

BACKGROUND

1. Field

The following description relates to a chassis frame for an electric vehicle, and more particularly, to a chassis frame for an electric vehicle, which has a battery integrated structure.

2. Description of the Related Art

In general, an electric vehicle (EV) refers to a vehicle that acquires power by driving an AC or DC motor using battery power. Electric vehicles are classified into dedicated battery electric vehicles and hybrid electric vehicles. The dedicated battery electric vehicle drives a motor using power of a battery, and the battery is recharged when the power thereof is completely consumed. The hybrid electric vehicle charges a battery by generating electric power through an engine, and is driven by an electric motor using this electric power.

A chassis frame is a part to form the frame of an electric vehicle, and serves to support a load applied to the electric vehicle, and provide the space in which a battery for driving the electric vehicle is mounted. In the conventional chassis frame for an electric vehicle, an extruded material which has a structure to bolt a battery module as a separate module and serves to protect a battery pack, and an extruded material which is used for the chassis frame are doubly applied, which makes it inefficient to manufacture and assemble the chassis frame. Furthermore, since the battery module needs to be separately supplied, an excessive distribution cost occurs. Furthermore, since a wing portion formed by extending the sidewall of the battery is required to secure a seating surface for assembling the chassis frame and the battery, an excessive material cost is needed. Furthermore, since a side sill is seated above a side member, a separate operation for fixing the side member to a matching part of the side sill is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a chassis frame for an electric vehicle includes side sill parts, spaced apart from each other in a widthwise direction of the electric vehicle, and configured to absorb a shock force applied to the electric vehicle; a frame part, provided between the side sill parts, and configured to have a battery disposed therein; a cover part, detachably coupled to the frame part, and configured to support the battery disposed in the frame part; and a movement prevention part, provided between the frame part and the cover part, and configured to prevent a movement of the battery.

The frame part may be spaced apart from an inner surface of the side sill part, and may be configured to face the inner surface of the side sill part.

The frame part may include a member part configured to have a pair of side members spaced apart from each other in the widthwise direction of the electric vehicle, and a pair of cross members spaced apart from each other in a longitudinal direction of the electric vehicle; a housing part disposed between the side members of the member part and the cross members of the member part, and configured to have the battery disposed therein; and a mounting part configured to have a first side recessed into the member part, and a second side connected to the housing part, such that the movement prevention part is mounted in the mounting part.

The cover part may include a first cover detachably coupled to the member part, and configured to cover a first side of the housing part; and a second cover detachably coupled to the member part, and configured to cover a second side of the housing part and configured to support the movement prevention part and the battery.

The movement prevention part may include a movement prevention member configured to have a first side disposed in the mounting part, and a second side configured to contact a side surface of the battery; and a fastening hole disposed through the movement prevention member, such that a fastening member enters the fastening hole, wherein the fastening member is configured to connect the movement prevention member, the member part and the cover part as one body.

The second side of the movement prevention member may be configured to protrude by a predetermined distance toward the housing part, and is configured to be in contact with the side surface of the battery.

The chassis frame may further include a gasket part provided between the member part and the movement prevention part, and configured to seal the housing part.

The gasket part may be composed of an elastic material, and a first side and a second side of the gasket part are configured to contact the member part and the movement prevention part, respectively.

The chassis frame may further include a plurality of ribs, extending in a longitudinal direction of the side sill parts, and configured to disperse the shock force.

Other features and aspects will be apparent from the following detailed description, the drawings, and the claims.

Figure 1:
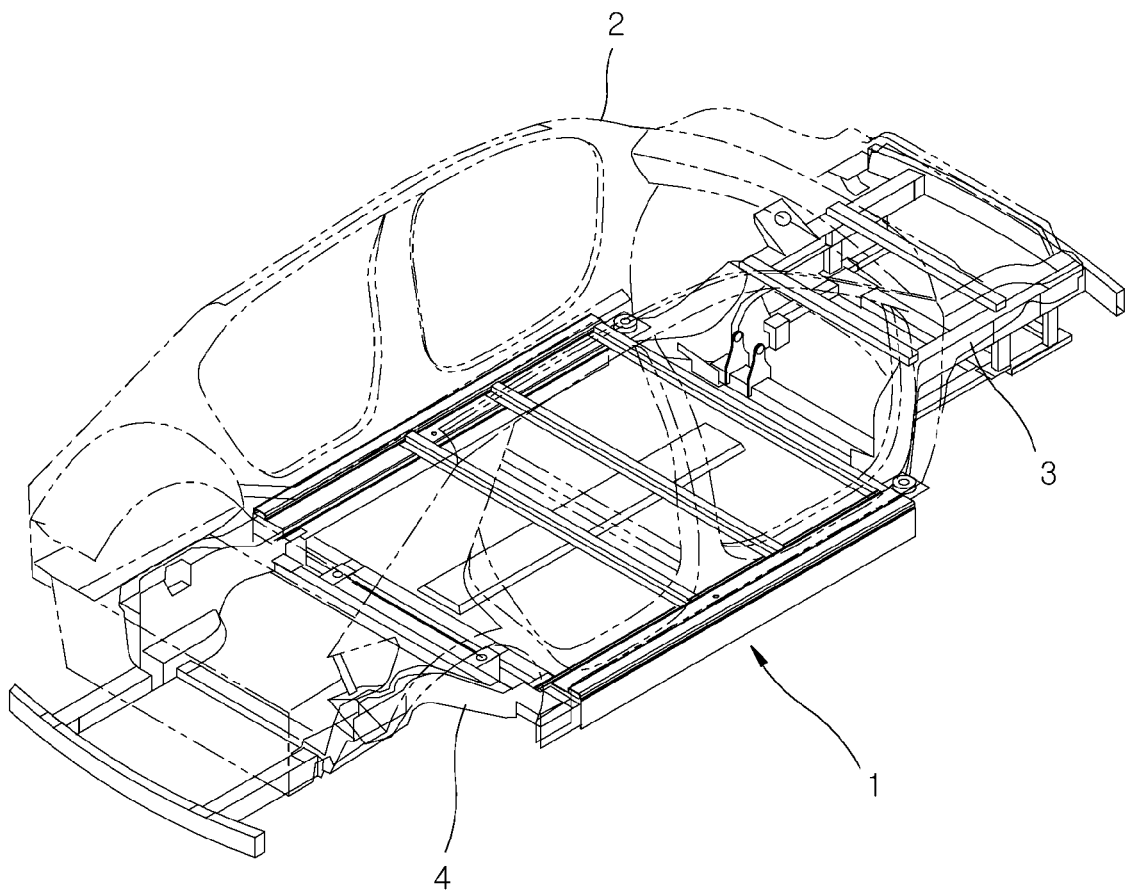
FIG. 1 is a diagram schematically illustrating that a chassis frame for an electric vehicle in accordance with an embodiment of the present disclosure is installed.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Various embodiments are directed to a chassis frame for an electric vehicle, which can expand a housing area for a battery, and make it easy to install and manage the battery.

Also, various embodiments are directed to a chassis frame for an electric vehicle, which can prevent a battery from moving.

Figure 2:
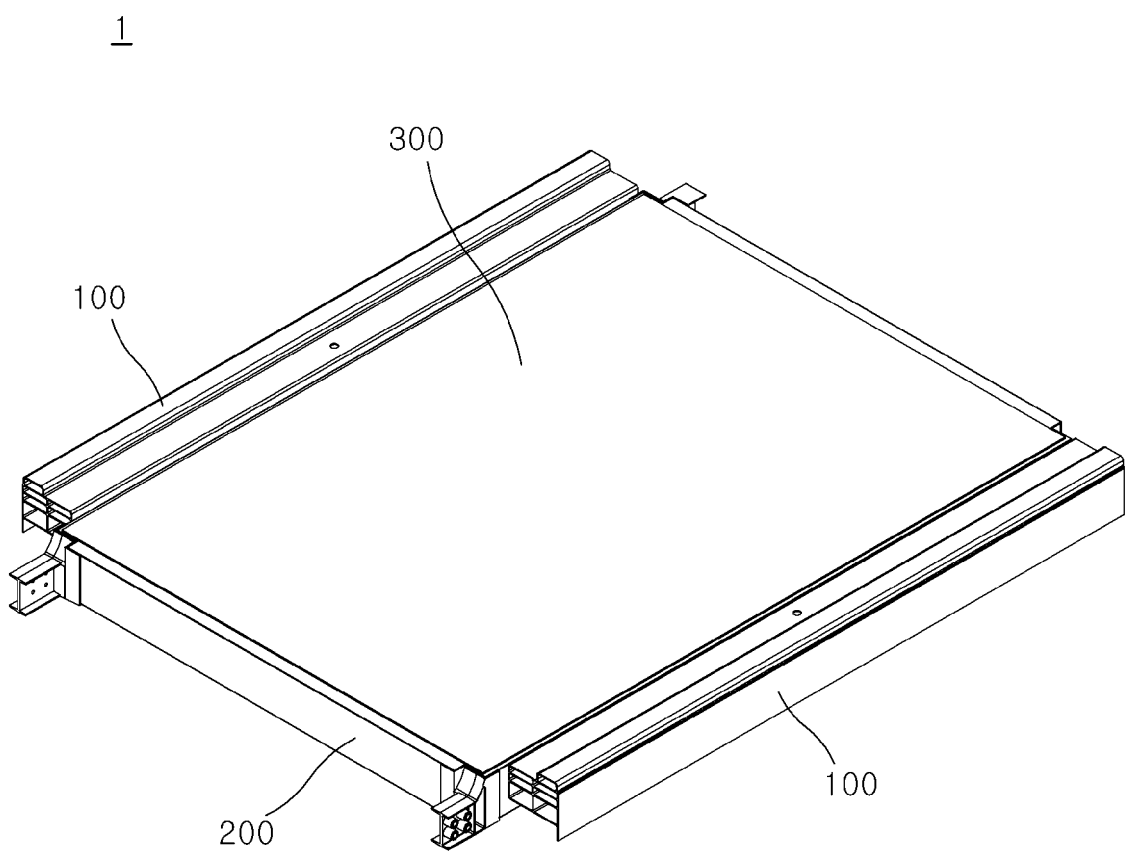
FIG. 2 is a perspective view schematically illustrating the configuration of the chassis frame for an electric vehicle in accordance with the embodiment of the present disclosure.
Figure 3:
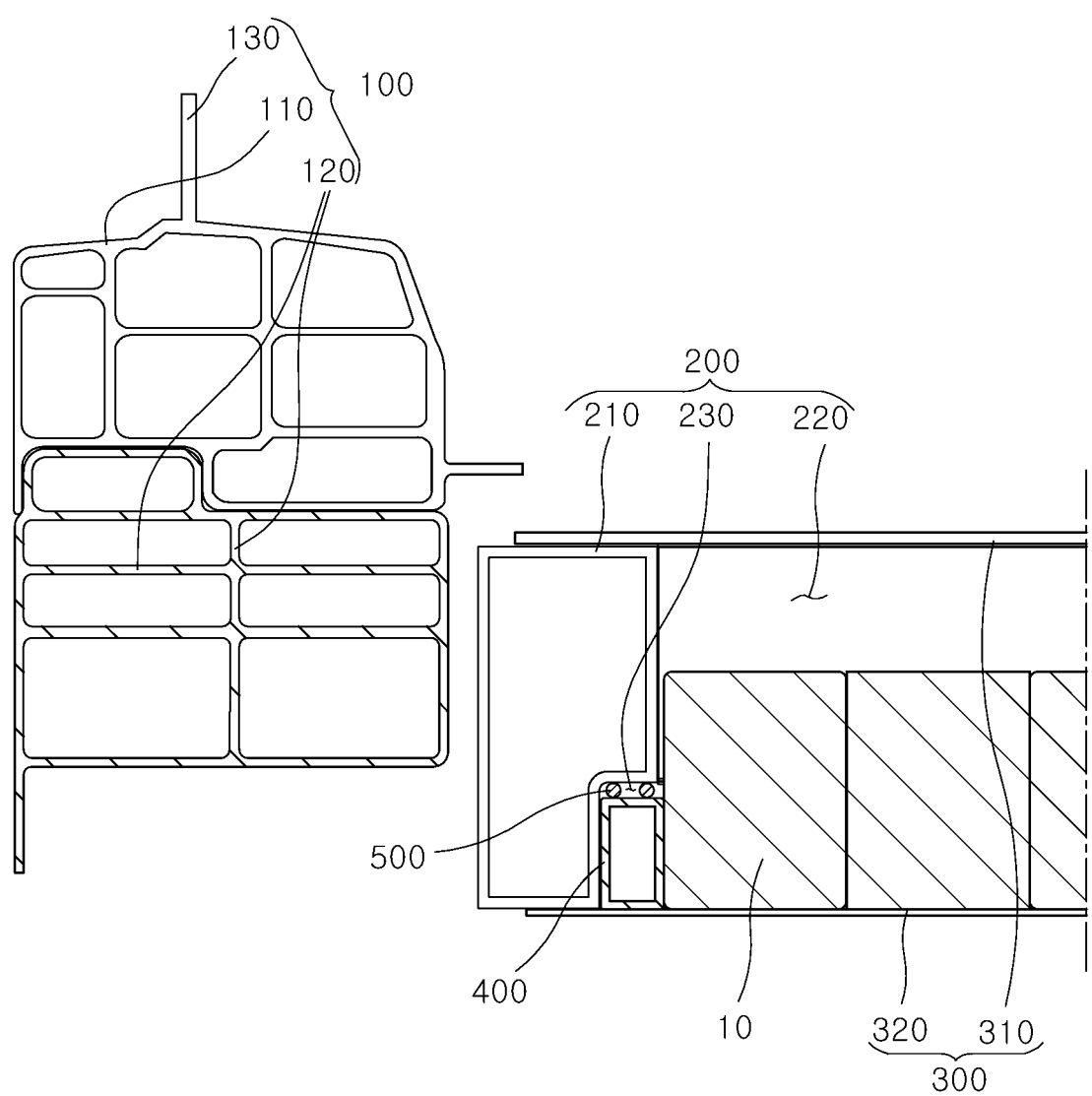
FIG. 3 is a cross-sectional view schematically illustrating the configuration of the chassis frame for an electric vehicle in accordance with the embodiment of the present disclosure.
Figure 4:
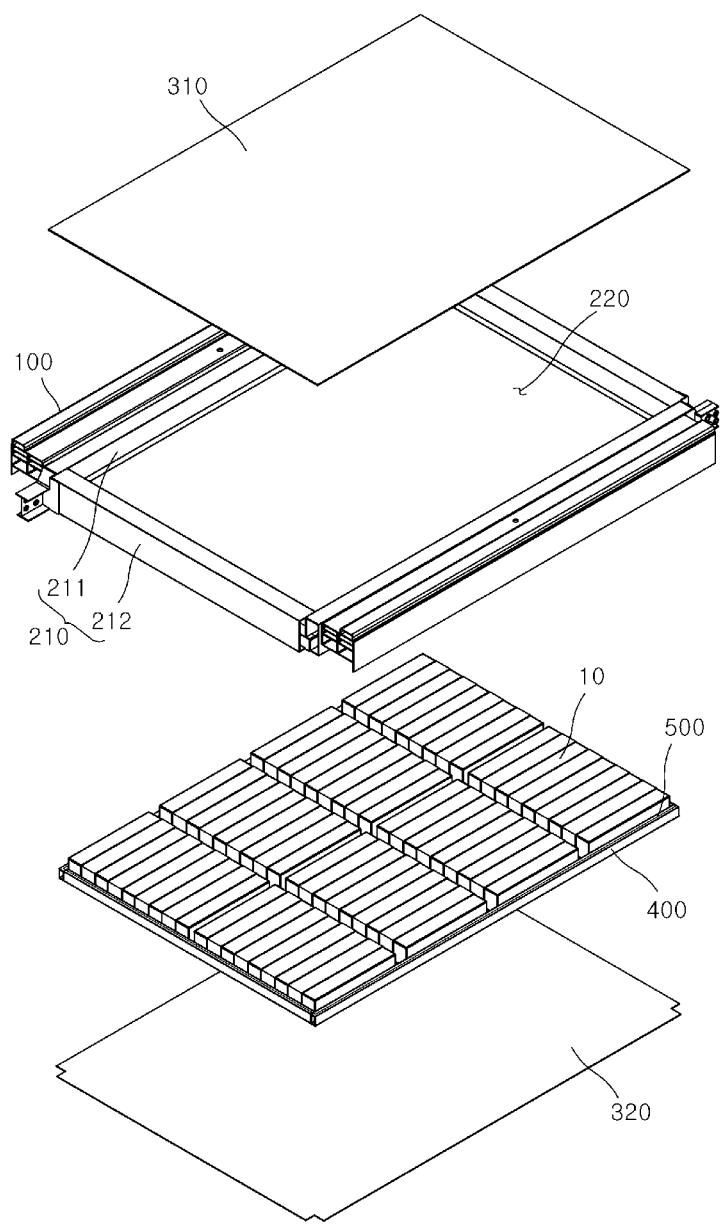
FIG. 4 is an exploded perspective view schematically illustrating the configuration of the chassis frame for an electric vehicle in accordance with the embodiment of the present disclosure.
Figure 5:
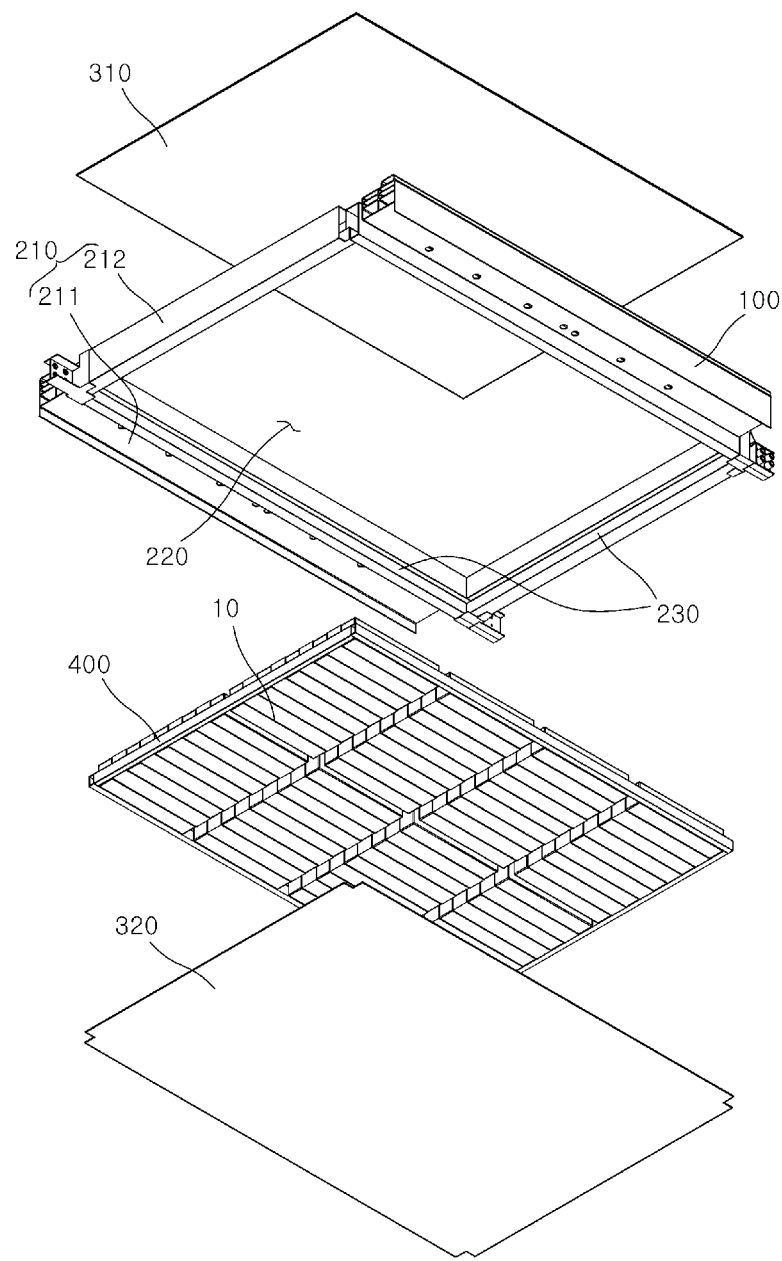
FIG. 5 is an exploded perspective view schematically illustrating the configuration of the chassis frame for an electric vehicle in accordance with the embodiment of the present disclosure, when seen from a different side from FIG. 4.

FIG. 1 is a diagram schematically illustrating that a chassis frame for an electric vehicle in accordance with an embodiment of the present disclosure is installed, FIG. 2 is a perspective view schematically illustrating the configuration of the chassis frame for an electric vehicle in accordance with the embodiment of the present disclosure, FIG. 3 is a cross-sectional view schematically illustrating the configuration of the chassis frame for an electric vehicle in accordance with the embodiment of the present disclosure, FIG. 4 is an exploded perspective view schematically illustrating the configuration of the chassis frame for an electric vehicle in accordance with the embodiment of the present disclosure, and FIG. 5 is an exploded perspective view schematically illustrating the configuration of the chassis frame for an electric vehicle in accordance with the embodiment of the present disclosure, when seen from a different side from FIG. 4.

A chassis frame 1 for an electric vehicle in accordance with an embodiment of the present disclosure forms the exterior of a lower vehicle body disposed under an upper vehicle body 2 of a electric vehicle. Referring to FIGS. 1 to 5, the chassis frame 1 for an electric vehicle in accordance with the embodiment of the present disclosure includes side sill parts 100, a frame part 200, a cover part 300, a movement prevention part 400 and a gasket part 500.

The side sill parts 100 are spaced apart from each other in the widthwise direction of the electric vehicle, and extended in the longitudinal direction of the electric vehicle. The side sill part 100 has a structure capable of absorbing shock which is momentarily applied, like a bumper, and absorbs shock applied in the lateral direction of the electric vehicle. The side sill parts 100 may be provided as a pair. The pair of side sill parts 100 are disposed at the respective edges of the electric vehicle in the widthwise direction thereof. Both ends of the side sill part 100 may be coupled to a front frame 3 and a rear frame 4, which are spaced apart from each other in the front-to-rear direction of the electric vehicle, respectively, and supported by the front frame 3 and the rear frame 4. Alternatively, both ends of the side sill part 100 may be coupled to a floor panel (not illustrated) of the vehicle body, and supported by the floor panel. The side sill part 100 may be manufactured by extruding a metallic material such as aluminum or steel.

The side sill part 100 in accordance with the embodiment of the present disclosure may include a side sill body 110, a rib 120 and a flange 130.

The side sill body 110 forms the exterior of the side sill part 100. The side sill body 110 in accordance with the embodiment of the present disclosure may be formed in the shape of a hollow pipe having a closed cross-section. The side sill body 110 is extended in the longitudinal direction of the electric vehicle, and serves to support a load which is applied to the vehicle body in the longitudinal direction.

The rib 120 is formed in the side sill body 110, and serves to reinforce the stiffness of the side sill body 110. The rib 120 in accordance with the embodiment of the present disclosure may be provided as a plurality of ribs 120 which are disposed in the side sill body 110 so as to form a lattice pattern. The plurality of ribs 120 may be extended in the longitudinal direction of the side sill body 110. The ribs 120 uniformly disperse a shock load, which is transferred from the side sill body 110 in case of a side collision of the electric vehicle, through the lattice pattern.

The flange 130 is formed in the shape of a plate protruding to the outside of the side sill body 110. The flange 130 is firmly fixed to the floor panel of the electric vehicle or the like through welding or bolting, and supports the side sill body 110 with respect to the vehicle body. The number and positions of the flanges 130 may be changed in various manners in consideration of the shape of the vehicle body.

The frame part 200 is provided between the side sill parts 100, and serves to support a load applied to the electric vehicle. The frame part 200 is formed to have an internal space in which a battery 10 can be housed. Therefore, the frame part 200 may not only support the weight of the electric vehicle, but also play the role of the sidewalls of the battery 10, which has been covered by an existing battery module. Thus, a material cost required for manufacturing the battery module may be saved, and a wing part for securing a seating surface may not be separately formed. The frame part 200 is spaced apart from the inner surface of the side sill part 100 so as to face the inner surface of the side sill part 100. Thus, when the frame part 200 is applied, the side sill part 100 may be formed to have a larger height than in an existing structure in which the side sill part 100 is seated above the frame part 200, which makes it possible to secure more excellent side collision shock absorption performance. Also, the frame part 200 may further improve the space efficiency of the electric vehicle. For example, the frame part 200 may expand the housing area of the battery.

The frame part 200 in accordance with the embodiment of the present disclosure includes a member part 210, a housing part 220 and a mounting part 230.

The member part 210 forms the exterior of the frame part 200, and serves to support a load applied to the electric vehicle. The member part 210 may be formed by extrusion molding. The member part 210 in accordance with the embodiment of the present disclosure may include a pair of side members 211 spaced from each other in the widthwise direction of the electric vehicle, and a pair of cross members 212 spaced apart from each other in the longitudinal direction of the electric vehicle.

The side members 211 are each formed in the shape of a beam extended in the longitudinal direction of the electric vehicle, and serve to support a load applied in the longitudinal direction of the electric vehicle, and the cross members 212 are each formed in the shape of a beam extended in the widthwise direction of the electric vehicle, and serve to support a load applied in the widthwise direction of the electric vehicle. The pair of side members 211 and the pair of cross members 212 are disposed to form a closed cross-section. For example, the side members 211 and the cross members 212 may form a rectangular cross-section shape as illustrated in FIGS. 4 and 5.

The housing part 220 is disposed among the side members 211 and the cross members 212, and has the battery 10 housed therein. As the side members 211 and the cross members 212 form a closed cross-section, the housing part 220 in accordance with the embodiment of the present disclosure may be exemplified as an empty space formed in the center of the member part 210. Thus, the housing part 220 has a length and width which correspond to the distance between the inner surfaces of the pair of side members 211 and the distance between the inner surfaces of the pair of cross members 212, respectively. The housing part 220 has a height corresponding to the height of the side member 211 or the cross member 212.

The mounting part 230 has one side recessed into the member part 210 and the other side connected with the housing part 220. The mounting part 230 provides the member part 210 with an internal space in which the movement prevention part 400 to be described below can be housed. Thus, the movement prevention part 400 may be mounted in the mounting part 230. The mounting part 230 in accordance with the embodiment of the present disclosure may be formed in the shape of a groove which is concavely formed in the widthwise direction of the side member 211 and the cross member 212 from the inner surfaces of the side member 211 and the cross member 212. The mounting part 230 is disposed at the bottoms of the side member 211 and the cross member 212. The mounting part 230 has an inner surface connected with the housing part 220 and a bottom surface facing a second cover 320 which will be described below. The mounting part 230 is continuously extended in the longitudinal directions of the side members 211 and the cross members 212, thereby having a rectangular cross-sectional shape.

The cover part 300 is detachably coupled to the frame part 200, and serves to support the battery 10 housed in the frame part 200. As the cover part 300 is detachably coupled to the frame part 200, an operation of replacing or repairing the battery 10 housed in the frame part 200 may be easily performed by only removing the cover part 300. The cover part 300 in accordance with the embodiment of the present disclosure includes a first cover 310 and the second cover 320.

The first cover 310 is detachably coupled to the member part 210, and serves to cover one side of the housing part 220. The first cover 310 in accordance with the embodiment of the present disclosure may be disposed over the member part 210, and formed in the shape of a plate which covers the top of the housing part 220. The first cover 310 has a width corresponding to the width of the member part 210. The bottom edge of the first cover 310 comes into contact with the top surfaces of the side members 211 and the cross members 212. The first cover 310 may be detachably coupled to the side members 211 and the cross members 212 by a fastening member 5 exemplified as a screw or the like.

The second cover 320 is detachably coupled to the member part 210, and serves to cover the other side of the housing part 220. The second cover 320 in accordance with the embodiment of the present disclosure may be disposed under the member part 210, and formed in the shape of a plate which covers the bottom of the housing part 220. The second cover 320 has a width corresponding to the width of the member part 210. As the top surface of the second cover 320 is disposed to face the bottom of the housing part 220, the second cover 320 supports the battery 10 housed in the housing part 220. As the top surface of the second cover 320 is disposed to face the bottom surface of the mounting part 230, the second cover 320 supports the movement prevention part mounted 400 in the mounting part 230. The top edge of the second cover 320 comes into contact with the bottom surfaces of the side members 211 and the cross members 212. The first cover 310 may be detachably coupled to the side members 211 and the cross members 212 by the fastening member 5 exemplified as a nut or the like.

The movement prevention part 400 is provided between the frame part 200 and the cover part 300, and serves to prevent the battery 10 from moving. That is, the movement prevention part 400 has a structure which can be brought into close contact with the battery 10, thereby preventing the movement of the battery 10 in the housing part 220 due to a gap between the battery 10 and the member part 210. Therefore, even while the electric vehicle travels or even when the second cover 320 is removed to replace the battery 10, the movement prevention part 400 may prevent the battery 10 from being separated from the regular position.

Figure 6:
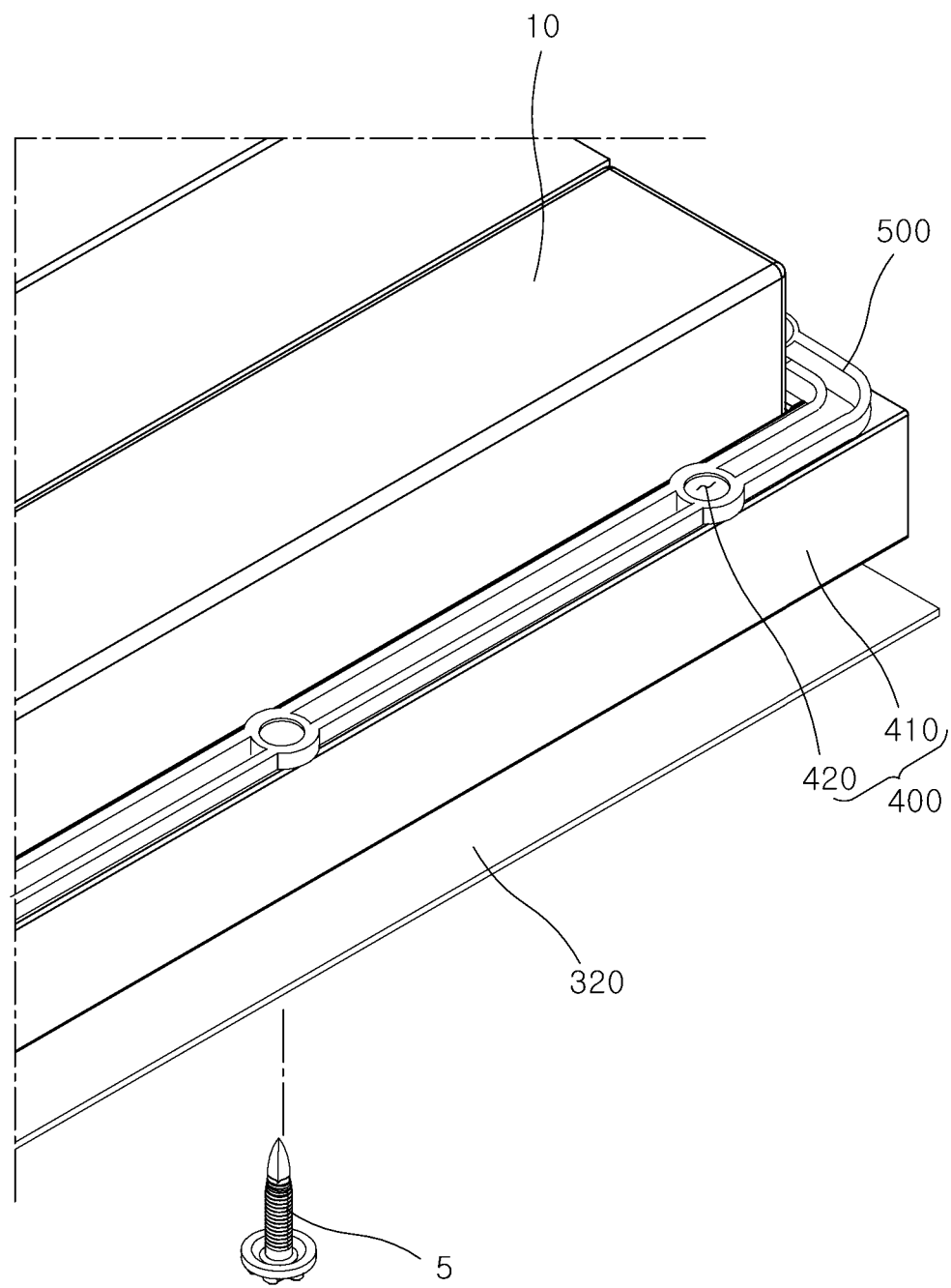
FIG. 6 is an expanded view schematically illustrating the configurations of a movement prevention part and a gasket part in accordance with the embodiment of the present disclosure.

FIG. 6 is an expanded view schematically illustrating the configurations of the movement prevention part and the gasket part in accordance with the embodiment of the present disclosure.

Referring to FIGS. 2 to 6, the movement prevention part 400 in accordance with the embodiment of the present disclosure includes a movement prevention member 410 and a fastening hole 420.

The movement prevention member 410 has one side disposed in the mounting part 230 and the other side coming into contact with a side surface of the battery 10. The other side of the movement prevention member 410, which comes into contact with the side surface of the battery 10, protrudes by a predetermined distance toward the housing part 220 so as to be placed close to the side surface of the battery 10. The movement prevention member 410 in accordance with the embodiment of the present disclosure may be formed in the shape of a rectangular frame disposed along the inside of the mounting part 230. The movement prevention member 410 has a cross-section corresponding to the mounting part 230 so as to be smoothly housed in the mounting part 230. The top and bottom surfaces of the movement prevention member 410 are brought into contact with the bottom surfaces of the side members 211 and the cross members 212 and the top surface of the second cover 320, and supported by the bottom surfaces of the side members 211 and the cross members 212 and the top surface of the second cover 320, respectively. The left side surface of the movement prevention member 410 (based on FIG. 3) is brought into contact with the side member 211 and the cross member 212, and supported by the side member 211 and the cross member 212. The right side surface of the movement prevention member 410 (based on FIG. 3) protrudes by a predetermined distance into the housing part 220, and closely supports a side surface of the battery 10 housed in the housing part 220. The distance by which the movement prevention member 410 protrudes into the housing part 220 may be changed to various values depending on the gap between the battery 10 and the member part 210. As the movement prevention member 410 comes into contact with the battery 10 across the entire member part 210, the movement prevention member 410 may prevent the battery 10 from moving in all directions within the housing part 220.

The fastening hole 420 is formed through the movement prevention member 410. The fastening hole 420 provides the space which the fastening member 5 such as a nut enters, the fastening member 5 serving to connect the movement prevention member 410, the member part 210 and the cover part 300 as one body. The fastening hole 420 may be provided as a plurality of fastening holes. In this case, the plurality of fastening holes 420 are disposed at predetermined intervals along the edge of the movement prevention member 410. The fastening hole 420 in accordance with the embodiment of the present disclosure may be formed in the shape of a hole passing through the movement prevention member 410 in the top-to-bottom direction. The fastening hole 420 has a diameter corresponding to the diameter of the fastening member 5. When the fastening member 5 is formed in the shape of a screw nut or the like, the fastening hole 420 may have a screw thread formed on the inner circumferential surface thereof so as to be screwed to the fastening member 5.

The gasket part 500 is provided between the member part 210 and the movement prevention part 400, and serves to seal the housing part 220. That is, the gasket part 500 has both sides which can be brought into close contact with the member part 210 and the movement prevention part 400, respectively, thereby preventing foreign matters or moisture from permeating into the battery 10, housed in the housing part 220, through a gap formed between the member part 210 and the movement prevention part 400. The bottom surface of the gasket part 500 in accordance with the embodiment of the present disclosure may be attached to the top surface of the movement prevention member 410, and the gasket part 500 may be formed in the shape of a belt extended along the edge of the movement prevention member 410. When the movement prevention member 410 is mounted in the mounting part 230, the top surface of the gasket part 500 is brought into close contact with the bottom surfaces of the side members 211 and the cross members 212. The gasket part 500 may be made of an elastic material such as rubber or silicone. Therefore, the gasket part 500 may be elastically deformed and more reliably brought into close contact with the member part 210 and the movement prevention part 400. The specific shape of the gasket part 500 is not limited to the shape illustrated in FIG. 6, but may be changed in various shapes as long as the gasket part 500 can seal the gap between the member part 210 and the movement prevention part 400.

In accordance with the embodiment of the present disclosure, the frame part may not only support the weight of the electric vehicle, but also play the role of the sidewalls of the battery, which has been covered by an existing battery module manufactured as a separate module. Thus, a material cost required for manufacturing the battery module may be saved.

Furthermore, the frame part is spaced apart from the inner surface of the side sill part so as to face the inner surface of the side sill part. Thus, since a separate operation of fixing the frame part to a matching part of the side sill part is not necessary, there is no concern about connection. The height of the side sill part may be extended to the position of the existing frame part, which makes it possible to secure more excellent side collision shock absorption performance.

Furthermore, the chassis frame for an electric vehicle in accordance with the embodiment of the present disclosure does not need a wing portion for assembling the battery module to the frame part, which makes it possible to expand the housing area of the battery while increasing the capacity of the battery.

Furthermore, when the chassis frame for an electric vehicle in accordance with the embodiment of the present disclosure is applied, the battery can be replaced by only removing the cover part, which makes it possible to improve the efficiency of the assembly process and A/S performance.

Furthermore, the chassis frame for an electric vehicle in accordance with the embodiment of the present disclosure includes the movement prevention part configured to restrict the battery from moving in the housing part, thereby prevent the battery from separating from the regular position when the battery is assembled and replaced.

Furthermore, the chassis frame for an electric vehicle in accordance with the embodiment of the present disclosure includes the gasket part configured to prevent foreign matters or moisture from permeating into the battery, thereby preventing the degradation in performance of the battery.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A chassis frame for an electric vehicle, comprising:
    a battery;
    side sill parts, spaced apart from each other in a widthwise direction of the electric vehicle, and configured to absorb a shock force applied to the electric vehicle;
    a frame, provided between the side sill parts, and configured to have the battery disposed therein, wherein the frame is spaced apart from inner surfaces of each of the respective side sill parts, and is configured to face the inner surface of the side sill parts;
    a cover part, detachably coupled to the frame, and configured to support the battery disposed in the frame; and
    a movement prevention part, provided between the frame and the cover part, and configured to prevent a movement of the battery,
    wherein the frame comprises:
        a member part having a pair of side members spaced apart from each other in the widthwise direction of the electric vehicle, and a pair of cross members spaced apart from each other in a longitudinal direction of the electric vehicle;
        a housing disposed between the side members of the member part and the cross members of the member part, and configured to have the battery disposed therein; and
        a mounting part configured to have a first side recessed into the member part, and a second side connected to the housing, and
    wherein a side of the movement prevention part is disposed in the mounting part and another side of the movement prevention part is in contact with a side surface of the battery, and a gasket part to seal the housing is provided between the member part and the movement prevention part.

2. The chassis frame of claim 1, wherein the cover part comprises:
    a first cover detachably coupled to the member part, and configured to cover a first side of the housing; and
    a second cover detachably coupled to the member part, and configured to cover a second side of the housing and configured to support the movement prevention part and the battery.

3. The chassis frame of claim 1, wherein the movement prevention part comprises:
    a movement prevention member configured to have a first side disposed in the mounting part, and a second side configured to contact a side surface of the battery; and
    a fastening hole disposed through the movement prevention member, such that a fastening member enters the fastening hole,
    wherein the fastening member is configured to connect the movement prevention member, the member part and the cover part as one body.

4. The chassis frame of claim 3, wherein the second side of the movement prevention member is configured to protrude by a predetermined distance toward the housing, and is configured to be in contact with the side surface of the battery.

5. The chassis frame of claim 1, wherein the gasket part is composed of an elastic material, and a first side and a second side of the gasket part are configured to contact the member part and the movement prevention part, respectively.

6. The chassis frame of claim 1, further comprising a plurality of ribs, extending in a longitudinal direction of the side sill parts, and configured to disperse the shock force.

* * * * *